METHOD OF COOKING GRAIN IN A CLOSED SYSTEM

Original Filed April 7, 1961 2 Sheets-Sheet 1

METHOD OF COOKING GRAIN IN A CLOSED SYSTEM

Original Filed April 7, 1961 2 Sheets-Sheet 2

United States Patent Office

Re. 26,257
Reissued Aug. 29, 1967

26,257
METHOD OF COOKING GRAIN IN A CLOSED SYSTEM

Russell Stacy Altman, deceased, late of Troy, Ohio, by George I. Altman, 1720 Pennsylvania Ave., Irwin, Pa. 15642, and Mary Jane Ward, nee Altman, Fairway Drive, Troy, Ohio 45373, coexecutors Original No. 3,181,955, dated May 4, 1965, Ser. No. 158,087, Dec. 8, 1961, which is a division of Ser. No. 101,432, Apr. 7, 1961, now Patent No. 3,229,617, dated Jan. 18, 1966. Application for reissue June 25, 1965, Ser. No. 469,968
7 Claims. (Cl. 99—80)

Matter enclosed in heavy brackets [ ] appears in the original patent but forms no part of this reissue specification; matter printed in italics indicates the additions made by reissue.

This is a divisional application of my copending application Ser. No. 101,432, filed Apr. 7, 1961, *now Patent No. 3,229,617.*

The present invention relates to the cooking of grain, and, more particularly, to the cooking of grain such as soy beans and other types of grains in milling plants. The cooking of grain of the above-mentioned types has, prior to my invention, been carried out in batches. More specifically, such batch was filled into a closed container and cooked and subsequently dried in one and the same apparatus. After the batch has been sufficiently dried, the apparatus is stopped, the cooked grain is discharged, and the apparatus then filled with a new charge going through the same process.

This cooking and drying process is rather expensive inasmuch as only a relatively small quantity of grain can be cooked and dried at one and the same time inasmuch as the cookers in use prior to my invention have a relatively low capacity. Furthermore considerable amounts of steam and heat are lost each time the drying process has been completed and the cooked and dried charge is withdrawn from the apparatus.

It is, therefore, an object of the present invention to provide a method of cooking grain of various types, which will overcome the above-mentioned drawbacks.

It is another object of this invention to provide a method of cooking grain which can be carried out on a continuous basis so that charges of grain can be cooked in a continuous and uninterrupted manner, while processed grain can likewise be withdrawn in a continuous manner.

These and other objects and advantages of the invention will appear more clearly from the following specification in connection with the accompanying drawings, in which.

Figures 1, 2:
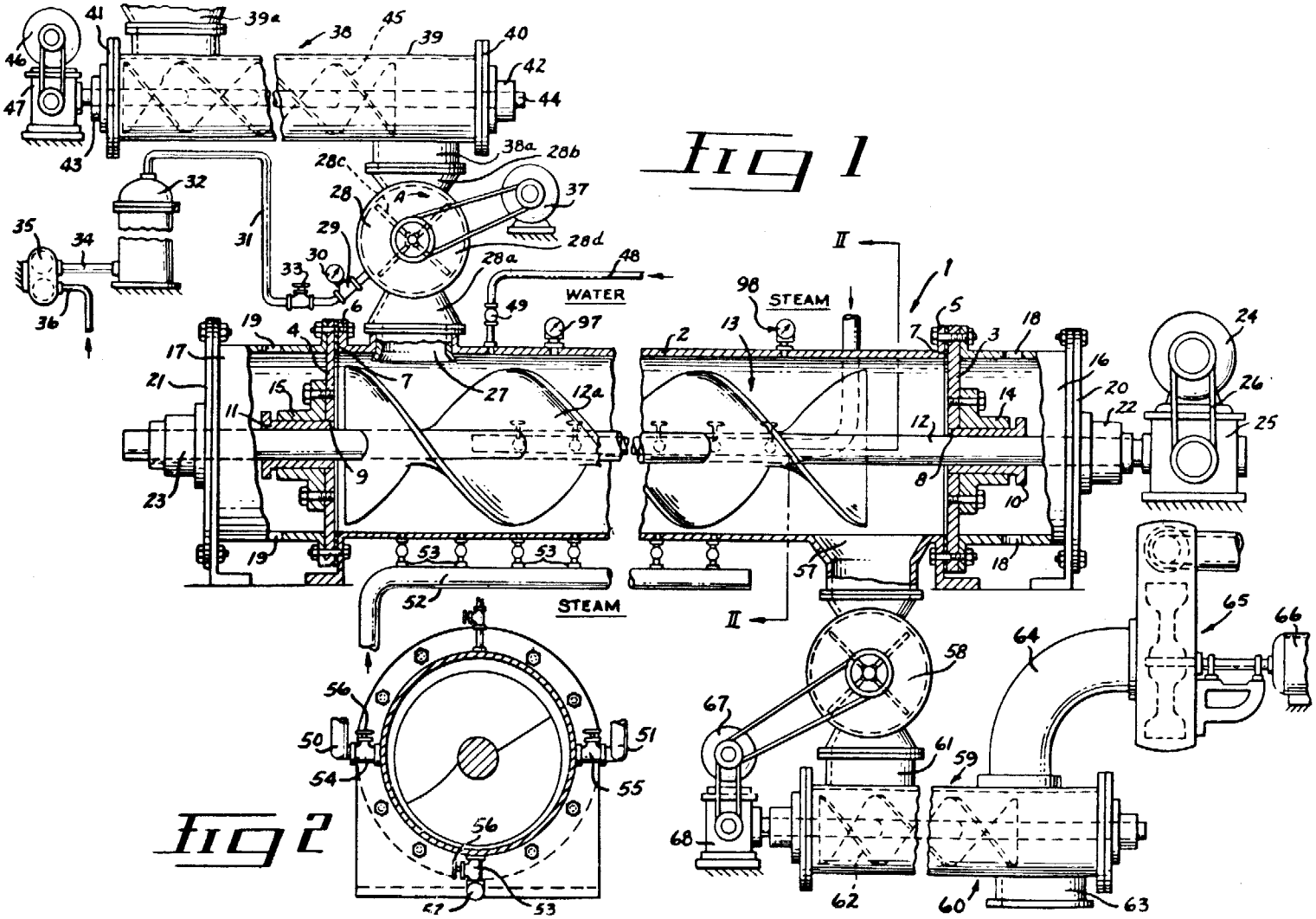
FIGURE 1 illustrates a grain cooker, partially in longitudinal section and partially in elevation, for carrying out the method according to the present invention.
FIGURE 2 is a section along line II—II of FIGURE 1.

FGURE 3a is a modified version of a grain cooker differing from that of FIG. 1 primarily in the conveyor type employed, likewise for carrying out the method according to the present invention.

Figures 3, 3A, 4, 5, 6:
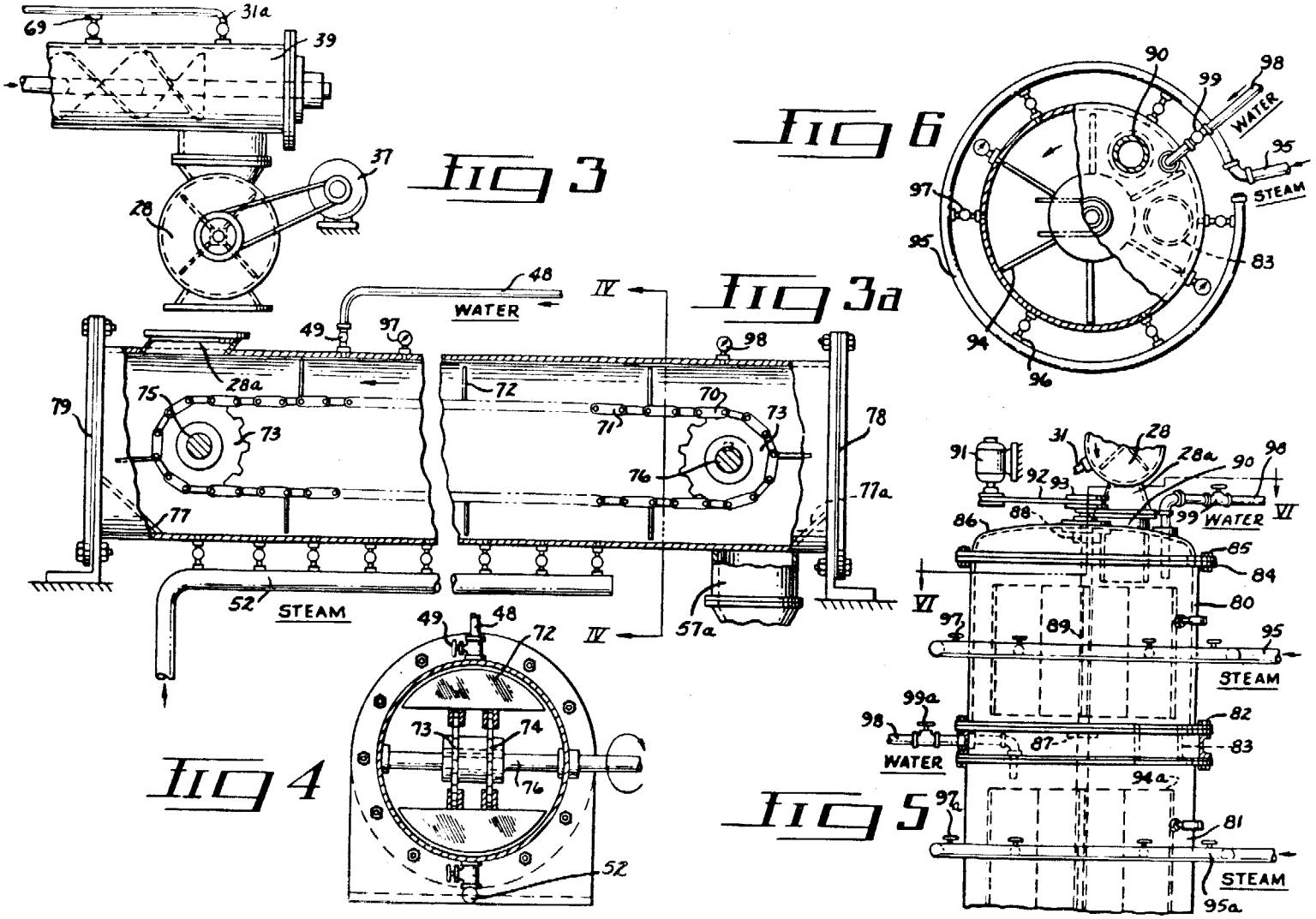
FIGURE 3 shows a modified version of a feeding conveyor-trap arrangement and compressed air supply thereto in connection with a grain cooker for carrying out the method according to the present invention.

FIGURE 4 is a section along the line IV—IV of FIGURE 3a.

FIGURE 5 shows still another modification of grain cooker for carrying out the method according to the present invention, said last-mentioned grain cooker differing from that of FIGS. 1 to 3 primarily in that its longitudinal axis is vertical instead of horizontal.

FIG. 6 is a section along the line VI—VI of FIGURE 5.

The method according to the present invention is characterized primarily in that the grain to be cooked is continuously fed into and conveyed through and out of a cooker in which the grain is subjected to steam and pressure while near the inlet to the cooker an air pressure is created at least as high as the steam pressure in said cooker.

Referring now to the drawings in detail and FIG. 1 thereof in particular, the cooker shown in FIG. 1 and generally designated 1 comprises a relatively long standard steel pipe 2 which may henceforth be called the cooker pipe. This cooker pipe 2 is closed at its ends by lids 3 and 4 bolted to flanges 5 and 6, respectively, of the cooker pipe. Asbestos seals 7 or gaskets of any other convenient type are interposed between the respective lids 3, 4 and flanges 5, 6 so as to assure a good seal. The central portions of the lids 3 and 4 are each provided with an opening 8, 9 through which extend sleeves 10, 11, respectively, for instance of bronze. Through these sleeves 10, 11 extends a rotatable shaft 12 provided with helical blading 12a. The said shaft 12 with its blading forms a worm conveyor generally designated 13. The openings 8, 9 around shaft 12 may be sealed in any convenient manner, for instance by stuffing boxes diagrammatically illustrated in the drawings and designate 14 and 15. Flanged to each of said lids 3 and 4 are tubular sections 16, 17 respectively provided with openings 18 and 19. The outer ends of said tubular sections 16, 17 have bolted thereto lids 20, 21 carrying anti-friction bearings 22, 23. The openings 18, 19 allow access to the parts 9, 10, 14, 15 and also permit a venting and thus a cooling of the interior of the tubular sections 16, 17. Due to the fact that the anti-friction bearings 22, 23 are spaced from the lids 3, 4 and are arranged on the outside of the lids 20, 21, they are not affected by the heat in the cooker pipe 2. Shaft 12 is drivingly connected to an electric motor 24 through the intervention of a gear box 25 and a belt 26.

The cooker pipe 2 is, near lid 4, provided with an inlet connection 27 to which is flanged the outlet 28a of a rotary trap 28 of any standard design. The rotary trap has an inlet 28b. Between the inlet 28b and the outlet 28a the said trap has a rotary bladed wheel 28c which is fitted with slight play into a cylinder 28d sufficient to allow rotation of the bladed wheel in said cylinder and to carry grain received through the inlet 28b from the latter to and into the outlet 28a. This rotary trap 28 has furthermore connected thereto a T-piece 29 carrying a pressure gauge 30 and being connected to a conduit 31 leading to a compressed air reservoir 32. Interposed in said conduit 31 is a shut-off valve 33. The compressed air reservoir 32 has in its turn connected thereto a pipe 34 leading to the pressure side of an air pump 35 the suction side of which has connected thereto an intake pipe 36. The rotary trap is adapted to be driven by a motor 37 of any desired type, preferably an electric motor, e.g. in the direction of the arrow A.

Connected to the inlet 28b of the rotary trap 28 is the outlet 38a of a feeding conveyor generally designated 38. The feeding conveyor 38 comprises substantially a pipe 39 closed at its ends by lids 40, 41 which have connected thereto bearings 42, 43 in which is rotatably journalled a shaft 44 with helical blades 45 connected thereto so that shaft 44 with the blades 45 forms a worm conveyor. The blades of the worm conveyor may extend throughout the length of pipe 39 but it is sufficient if they extend slightly into the range of the connection 38a as shown in the drawing. The worm conveyor may be driven in any convenient manner, for instance by means of an electric motor 46 through the intervention of a gear box 47.

The arrangement 29 to 36 is of foremost importance for the present invention and constitutes the very means which will prevent steam from passing from the cooker pipe into the feeding conveyor, thereby for the first time in the grain cooker art making possible a continuous cooking operation.

More specifically, the air under pressure delivered through the air conduit 31 has a manifold purpose, namely, (a) It not only counteracts the steam pressure on the cooker side of the trap but effectively keeps the steam in the cooker and prevents any substantial amount of the steam from entering the trap and the feeding conveyor.

(b) It exerts a pressure on the grain being fed into the trap and always sweeps the blades of the rotary trap clean.

(c) By keeping the steam from passing through the trap into the feeding conveyor, the grain in the feeding conveyor will not absorb any material amount of moisture while it passes through the feeding conveyor, thereby preventing the grain from sticking to the feeding conveyor, and thus making possible a continuous feeding operation. It will be appreciated that even if relatively small amounts of steam from the cooker would enter the feeding conveyor, the moisture of the steam would be absorbed by the grain which would then swell between the blading of the worm conveyor to such an extent that the worm conveyor would be unable to rotate, whereby the feeding would stop.

The pressure of the air conveyed from the compressed air reservoir 32 through conduit 31 into trap 28 may vary in conformity with the type of grain being processed. As an example, the air pressure may vary, for instance, from 5 to 10 pounds, in which instance the steam pressure in the cooker may, for instance, vary from 5 to 9 pounds. At any rate, the air pressure must at least be as high as the steam pressure. As a mere example, soy beans have been cooked at a steam pressure of 5 pounds and an air pressure of 5 pounds, whereas when cooking corn at a steam pressure of 9 pounds, an air pressure of 10 pounds was necessary. The air will thus maintain the trap at a pressure sufficient to prevent the steam from entering the feeding conveyor so that the grain therein would become sticky. While air will pass through the trap into the cooker, this will not interfere with the cooking operation. It will, of course, be understood that the feeding conveyor end adjacent the trap 28 and also its connection with said trap are properly sealed. The grain in the feeding conveyor will itself provide a sufficient seal with regard to the hopper 39a against any material loss of air which would interfere with the proper operation of the cooker. The length of the pipe 39 of the feeding conveyor may vary in conformity with the location of the cooker and charging facilities and may, for instance, have a length of 5 feet. The degree of closure of valve 33 will allow any desired adjustment of the air in trap 28.

Near the inlet connection 27 through which the grain passes from trap 28 into cooker pipe 2 there is arranged a water feeding line 48 leading from a water supply source (not shown in the drawings) into the interior of the cooker pipe 2 to feed water into the cooker pipe in conformity with the respective requirements. The water from the water line 48 is necessary to add moisture to the moisture of the steam in the cooker pipe. The steam moisture alone is not sufficient, in most instances, for a proper cooking of the grain. The amount of water which is to be added will be charged according to the condition of the grain as it comes out of the cooker. More specifically, if the cooked grain does not contain sufficient moisture, a valve 49 in the water line 48 may be adjusted so as to allow more water to flow into the cooker. If there is too much moisture in the cooked grain, the amount of water will, of course, be reduced. Once the water flow from line 48 has been adjusted by valve 49, it will normally stay in its respective adjustment during the cooking operation, and the water will flow continuously in conformity with the adjustment of valve 49.

The cooker pipe 2 according to FIG. 1 communicates with a plurality of steam feeding lines 50, 51 and 52 preferably arranged as shown in FIGS. 1 and 2, although a different circumferential distribution and also a different distribution over the length of the cooker pipe 2 may be selected. As will be seen from FIG. 1, the steam feeding lines extend along the cooker pipe 2 over at least the major length thereof and will along their length be provided with nozzle-like branch tubes 53, 54, 55 leading into the cooker pipe 2. Each or a number of these branch tubes 53, 54, 55 may be provided with a valve 56 so that the inflow of steam along the cooker pipe can be controlled in conformity with the most efficient operation of the cooker. By arranging the branch pipes 54, 55 opposite to each other, an additional and effective agitation of the grain on the conveyor 12, 12a will be obtained.

Near the other end of the cooker pipe 2 there is provided a discharge connection 57 through which the cooked grain is discharged from cooker 2. The discharge from cooker 2 is passed into a trap 58 connected to the discharge connection 57. From the trap 58 the cooked grain is discharged into a cooler generally designated 59. The cooler 59 comprises a pipe 60 with an inlet connection 61 which is connected to and communicates with the discharge trap 58. The cooler pipe 60 has rotatably mounted therein a conveyor worm 62 which feeds the cooked grain received from the discharge trap 58 to a discharge connection 36 which latter may be connected either to rolls by means of which the material is flaked, or to driers for drying the cooked grain. Such rolls and driers are well known in the art and since they do not form a part of the present invention, they have not been shown in the drawings. The cooler pipe 60 communicates through a pipe 64 with a blower generally designated 65 of any standard type which is drivingly connected to an electric motor 66 and withdraws the hot air and steam from pipe 60 in order to cool the cooked grain in the cooler, while simultaneously, by drawing off the steam, promoting drying of the grain. The conveyor worm 62 is connected to a prime mover such as an electric motor 67 through a gear box 68.

The cooker system of the above described type has proved extremely successful and has made it possible for the first time to cook grain and process the same in a continuous manner. The cooker is easily able to be loaded every minute with from 100 to 400 pounds of grain. A device of this type has been successfully operated with a steam pressure, for instance of from 3 to 9 pounds in the cooker pipe and a temperature in the cooker pipe of from 150 to 230° F. Naturally, the steam pressure and temperature may be varied in conformity with the special requirements and type of grains involved. Also, the temperature will vary along the cooker by, for instance, 20 to 30° with the higher temperature near the discharge of the cooker.

While in the dimensions of the cooker pipe and cooler pipe may, of course, vary in conformity with the size of the plant, a cooker pipe of an inner diameter of 18 inches and a length of 36 feet with a cooler pipe with a diameter of 9 inches and a length of 12 feet, has been successfully employed.

Referring now to FIG. 3, the feeding conveyor-trap arrangement and compressed air supply therefor differs from the corresponding construction shown in FIG. 1 merely in that instead of supplying the compressed air from the reservoir 32 into the trap 28, the compressed air supply line 31a which, similar to line 31 receives its compressed air from a compressed air reservoir (not shown in FIG. 3), leads into the feeding conveyor pipe 39 near the front end thereof and has a branch line 69 leading into the conveyor pipe 39 at a greater axial distance from the front end of pipe 39. In all other respects, the feeding conveyor-trap arrangement of FIG. 3 corrsponds to that of FIG. 1, and therefore similar parts have been designated with the same reference numerals as in FIG. 1. For instance, the distance between the front end of line 31a and branch line 69 may be 18 inches.

With regard to the cooker shown in FIG. 3a, this cooker is basically the same as that of FIG. 1, and, therefore, similar parts have been designated with the same reference numerals as in FIG. 1. The arrangement of FIG. 3a differs from that of FIG. 1 primarily in that the worm conveyor 12, 12a of FIG. 1 has been replaced by a drag chain conveyor 70. The drag chain conveyor 70 consists mainly of chain means 71 having connected thereto paddles 72 arranged in spaced relationship to each other. The chain means 71 is supported by pairs of chain sprockets 73, 74 supported by shafts 75 and 76. The shaft 76 having one pair of chain sprockets 73, 74 keyed thereto may be driven by a prime mover (not shown in the drawings) as indicated by the arrow in FIG. 4 so as to actuate the chain conveyor to move in the direction indicated by the arrow in FIG. 3a.

The grain charged through a trap of the type designated 28 in FIG. 1 and through the outlet 28a into the cooker pipe 2 drops on an inclined steel board 77 and is then by means of the paddles 72 dragged along the bottom portion of cooker pipe 2. It will be noticed that the inlet 28a is somewhat inclined so as to cause the grain being charged into pipe 2 to pass around the left-hand sprocket wheels (with regard to FIG. 3a). The arrangement according to FIG. 3a is provided with one steam line 52 only, although, of course, additional steam lines may be provided if so desired. All other parts and also the operation of the cooker of FIG. 3a will be obvious from the description of FIG. 1 so that a further description of FIG. 3a will not be necessary. It may, however, be added that inasmuch as the conveyor means in the cooker of FIG. 3a does not have a shaft extending longitudinally through the cooker and being journalled at the ends thereof, the cooker pipe of FIG. 3*a* can be closed at its ends by lids 78 and 79. To avoid a dead corner near lid 78, an inclined steel board 77a similar to the steel board 77 may be provided and arranged near the discharge 57a, as shown in FIG. 3.

Referring now to the modified cooker shown in elevation in FIG. 5, this cooker differs from those of FIGS. 1 and 3a primarily in that its longitudinal axis is vertical instead of horizontal. The cooker according to FIG. 5 is preferably built up of a plurality of pipe sections of which only the sections 80 and 81 are shown. Each pipe section forms by itself a cooker. To this end, the pipe section 80 is provided with a bottom 82 having provided therein an outlet 83. Furthermore, the pipe section 80 has a top 84 to which is connected in any convenient manner, for instance by bolts 85, a head 86. Mounted in the bottom 82 and in the head 86 are bearings 87 and 88 for journalling a vertical shaft 89. The head 86 has connected thereto a chute 90 the lower end of which extends into the pipe section 80 while the upper end is connected in any convenient manner to an outlet 28a of a rotary trap 28 having connected thereto a compressed air supply line 31. The trap 28 of FIG. 5 corresponds to the trap 28 of FIG. 1, and the connection of the air supply line 31 in FIG. 5 likewise corresponds to that of FIG. 1. It is to be understood that the trap 28 of FIG. 5 is connected to a feeding conveyor corresponding to the feeding conveyor 38 of FIG. 1 through a corresponding connection 38a as likewise shown in FIG. 1. In other words, the construction shown in FIG. 1 above the inlet connection 27 is to be employed in connection with the cooker of FIG. 5. The arrangement of FIG. 5 furthermore comprises an electric motor 91 which through a belt 92 and pulley 93 drives the shaft 89. Keyed to shaft 89 are vanes or blades 94 (see FIG. 6). The pipe section 80 is surrounded by a steam line 95 from which radially branch off nozzles 96 communicating with the interior of tube section 80. Each of said nozzles has a valve 97 associated therewith for controlling the quantity of steam passing through said nozzles per time unit into the interior of the cooker section 80. Similar to the arrangement of FIGS. 1 and 3a, also the cooker of FIG. 5 is provided with a water supply line 98 for controlling the humidity in the cooker. Also the water line 98 has a control valve 99 interposed therein.

The cooker section 81 substantially corresponds to the cooker section 80 with the parts pertaining thereto, and, accordingly, corresponding parts of the cooker section 81 have been designated with the same reference numerals as those of the cooker section 80 but with the additional reference a.

The operation of the cooker of FIG. 5 corresponds substantially to that of FIGS. 1 and 3. More specifically, the grain to be processed is fed by a feeding conveyor corresponding to the feeding conveyor of FIG. 1 or FIG. 3, into the trap 28 of FIG. 5 and from there through chute 90 into the cooker section 80. Here the vanes or blades 94 keyed to the shaft 89, which latter is rotated by motor 91, pass the received grain in the direction of the arrow of FIG. 6 from a place below chute 90 around the axis of shaft 89 to and through the outlet 83. Steam under pressure is supplied to the interior of the cooker through steam line 95 similar to the operation of FIGS. 1 and 3 while the humidity is controlled by water passing through the water line 98 into the cooker section 80.

The processed grain passing through the outlet 83 then passes into the cooker section 81 where it undergoes a further processing operation similar to the one encountered in tube section 80. These cycles may be repeated through all cooker sections of which the cooker of FIG. 5 may be made up. From the last outlet of the last cooker section, which outlet corresponds to the outlet 83, through a trap, the processed grain passes into a drier which may correspond to a drier system corresponding to that shown in FIG. 1 below the discharge connection 57.

It will be appreciated that if a relatively small capacity cooker only for continuous operation is desired, the cooker section 81 may be omitted, in which instance the processed grain passing through outlet 83 is directly discharged through a trap (corresponding, for instance, to trap 58) into the drier. On the other hand, if a large capacity vertical cooker is desired, the cooker may be built up by as many cooker sections 80, 81 as will be necessary. It will be appreciated that the vertical cooker according to FIG. 5 has the advantage that it requires relatively little bottom space and may, therefore, be particularly advantageous where limited bottom space only is available. It will also be appreciated that while in FIG. 5 the motor drives the shaft 89 directly through a pulley, if desired a stepdown transmission may be interposed between the motor and the pulley 93.

It will furthermore be appreciated that while according to FIG. 5 the compressed air supply pipe 31 is arranged in conformity with the arrangement of FIG. 1, it could, of course, also be arranged, for instance in conformity with the arrangement of FIG. 3.

The cooker may, of course, be provided with any desired gauges such as the gauges 97, 98 for indicating the pressure and degree of humidity inside the cooker pipe or pipes.

It is, of course, to be understood that the method according to the present invention may also be carried out by cookers other than those described hereinbefore, and that the method according to the invention is not limited to the specific description set forth above but also comprises any modifications within the scope of the appended claims.

Furthermore, while according to the arrangement shown in FIG. 1, the compressed air is blown into the grain while the latter is being moved through the trap, as evident from the arrow A, the method according to the present invention may also be carried out effectively if the direction of rotation of the rotary blade in trap 28 were reversed. Furthermore, instead of compressed air feeding pipe 31 leading into the left-hand side (with regard to FIGS. 1 and 5) of trap 28, the method according to the present invention may equally well be carried out if compressed air feeding pipe 31 would lead into the opposite side of trap 28 either into the grain-filled compartment between the trap blades or into an empty compartment between the trap blades.

What I claim is:

1. A method of continuously cooking grain in a closed system comprising a feeder section, a trap section following the feeder section, and a cooker section following the trap section which comprises: moving uncooked grain continuously from a supply thereof into and through the feeder section to the trap section, moving quantities of the uncooked grain downwardly through the trap section and into the inlet end of the cooker section, moving the grain continuously and substantially horizontally through the cooker section, discharging quantities of grain from the discharge end of the cooker section, continuously supplying steam at a pressure greater than atmospheric pressure to said cooker section to maintain therein an atmosphere of steam to accomplish cooking of the grain during movement thereof through the cooker section, and continuously supplying air to said trap section at pressure at least equal to the steam pressure in said cooker section whereby the air so supplied will move through the trap section and feeder section and prevent steam from the cooker section from moving into the trap and feeder sections and the grain being supplied to the cooker section via said feeder section and trap section will thus be maintained substantially unchanged as to mositure content prior to the entry of the grain into said cooker section.

2. The method according to claim 1 in which water is supplied to said cooker section in addition to the steam to control the humidity in the cooker section.

3. The method according to claim 1 wherein at least a part of the steam is supplied to the cooker section in the form of jets directed upwardly from the lower region of the cooker section beneath the grain therein so as to pass through the grain and agitate the same during the cooking thereof.

*4. A method of continuously cooking grain in a closed system comprising a feeder section, a trap section following the feeder section, and a cooker section following the trap section, which comprises: moving uncooked grain continuously from a supply thereof into and through the feeder section to the trap section, moving quantities of the uncooked grain through the trap section into the inlet end of the cooker section, moving the grain continuously through the cooker section, discharging quantities of grain from the discharge end of the cooker section, continuously supplying steam at a pressure greater than atmospheric pressure to said cooker section to maintain therein an atmosphere of steam to accomplish cooking of the grain during movement thereof through the cooker section, and continuously supplying air at a pressure at least equal to the stream pressure in said cooker section to a region between said cooker section and a part of that end portion of said feeder section which is adjacent said trap section whereby said air under pressure will prevent steam from the cooker section from moving into said feeder section.*

*5. A method of continuously cooking grain in a closed system comprising a feeder section, a trap section following the feeder section, and a cooker section following the trap section, which comprises: moving uncooked grain continuously from a supply thereof into and through the feeder section to the trap section, moving quantities of the uncooked grain through the trap section into the inlet end of the cooker section, moving the grain continuously through the cooker section, discharging quantities of grain from the discharge end of the cooker section, continuously supplying steam at a pressure greater than atmospheric pressure to said cooker section to maintain therein an atmosphere of steam to accomplish cooking of the grain during movement thereof through the cooker section, and continuously supplying air to said trap section at a pressure at least equal to the steam pressure in said cooker section whereby the air so supplied will prevent steam from the cooker section from moving into said feeder section.*

*6. A method of continuously cooking grain in a closed system comprising a feeder section, a trap section following the feeder section, and a cooker section following the trap section, which comprises: moving uncooked grain continuously from a supply thereof into and through the feeder section to the trap section, moving quantities of the uncooked grain through the trap section into the inlet end of the cooker section, moving the grain continuously through the cooker section, discharging quantities of grain from the discharge end of the cooker section, continuously supplying steam at a pressure greater than atmospheric pressure to said cooker section to maintain therein an atmosphere of steam to accomplish cooking of the grain during movement thereof through the cooker section, and continuously supplying air at a pressure at least equalling the steam pressure in said cooker section to that end portion of said feeder section which is adjacent said trap section thereby preventing steam from the cooker section from moving into said feeder section.*

*7. A method of continuously cooking grain in a closed system comprising a feeder section, a trap section following the feeder section, and a cooker section following the trap section, which comprises: moving uncooked grain continuously from a supply thereof into and through the feeder section to the trap section, moving quantities of the uncooked grain through the trap section into the inlet end of the cooker section, moving the grain continuously through the cooker section, discharging quantities of grain from the discharge end of the cooker section, continuously supplying steam at a pressure greater than atmospheric pressure to said cooker section to maintain therein an atmosphere of steam to accomplish cooking of the grain during movement thereof through the cooker section, and continuously supplying air at a pressure at least equal to the steam pressure in said cooker section to said system on the feeder section side of the inlet to said cooking section to maintain the pressure in said system on said side of the inlet at least equal to the pressure in said cooking section and to prevent steam from the cooker section from moving into said feeder section.*

References Cited

The following references, cited by the Examiner, are of record in the patented file of this patent or the original patent.

UNITED STATES PATENTS

| | | | |
|---|---|---|---|
| 959,448 | 5/1910 | Baxter | 99—443 |
| 2,489,925 | 11/1949 | Omwake | 214—17 |
| 2,838,401 | 6/1958 | Gates | 99—82 |

RAYMOND N. JONES, *Primary Examiner.*

A. LOUIS MONACELL, *Examiner.*